United States Patent
Postel et al.

(10) Patent No.: US 11,022,530 B2
(45) Date of Patent: Jun. 1, 2021

(54) SYSTEM AND METHOD FOR DETERMINING STRUCTURAL CHARACTERISTICS OF A MACHINE TOOL

(71) Applicants: GF Machining Solutions AG, Nidau (CH); Inspire AG, Zurich (CN)

(72) Inventors: Martin Postel, Zürich (CH); Nerzat Bircan Bugdayci, Zürich (CH); Fredy Kuster, Neuhaus SG (CH); Jean-Philippe Besuchet, Neuchatel (CH); Jérémie Monnin, Port (CH)

(73) Assignees: GF Machining Solutions AG; Inspire AG

( * ) Notice: Subject to any disclaimer, the term of this patent is extended or adjusted under 35 U.S.C. 154(b) by 91 days.

(21) Appl. No.: 16/426,331

(22) Filed: May 30, 2019

(65) Prior Publication Data

US 2019/0368990 A1    Dec. 5, 2019

(30) Foreign Application Priority Data

Jun. 1, 2018    (EP) .................... 18175533

(51) Int. Cl.
*B23Q 17/24* (2006.01)
*B23Q 15/007* (2006.01)
(Continued)

(52) U.S. Cl.
CPC ............. *G01N 3/30* (2013.01); *B23Q 15/007* (2013.01); *B23Q 17/12* (2013.01);
(Continued)

(58) Field of Classification Search
CPC .......... G01H 1/003; G01H 1/10; G01H 11/02; G01H 11/06; G01M 7/08; G01M 7/022;
(Continued)

(56) References Cited

U.S. PATENT DOCUMENTS 6,349,600 B1 * 2/2002 Davies ............... B23Q 17/0976
73/104
6,859,674 B1 * 2/2005 Seth ....................... B23Q 17/00
700/97

(Continued)

FOREIGN PATENT DOCUMENTS

| CN | 103217349 A | * | 7/2013 |
| EP | 2 824 440 A1 | | 1/2015 |
| EP | 2 916 187 A1 | | 9/2015 |

OTHER PUBLICATIONS

Postel et al., Improved stability predictions in milling through more realistic load conditions, Procedia CIRP 77, pp. 102-105, <https://www.sciencedirect.com/science/article/pii/S2212827118310801>(Year: 2018).*

(Continued)

*Primary Examiner* — Jonathan M Dunlap
(74) *Attorney, Agent, or Firm* — Harness, Dickey & Pierce, P.L.C.

(57) ABSTRACT

The present invention is directed to a system for determining the structural characteristics of a machine tool. The system comprises an excitation device configured to induce a dynamic excitation in a tool of the machine tool, a preloading device configured to generate a static force on the tool, and a sensing device for acquiring a set of data based on which the structural characteristics of the tool can be determined.

14 Claims, 6 Drawing Sheets

(51) Int. Cl.
*B23Q 17/12* (2006.01)
*G01H 9/00* (2006.01)
*G01H 11/02* (2006.01)
*G01H 11/06* (2006.01)
*G01N 3/30* (2006.01)
*G01N 3/22* (2006.01)

(52) U.S. Cl.
CPC ........... *B23Q 17/2428* (2013.01); *G01N 3/22* (2013.01); *G01H 9/006* (2013.01); *G01H 11/02* (2013.01); *G01H 11/06* (2013.01)

(58) Field of Classification Search
CPC .......... G01M 7/025; G01N 2203/0039; G01N 2203/005; G01N 3/22; G01N 3/30; G01N 3/317; B23B 2260/128; B23B 35/00; B23B 39/06; B23B 39/08; B23B 49/02; B23Q 15/007; B23Q 17/12; B23Q 2717/00; B23Q 17/2428; B64F 5/10; G05B 19/402; G05B 19/404; G05B 2219/45129
See application file for complete search history.

(56) References Cited

U.S. PATENT DOCUMENTS 10,191,017 B2 * 1/2019 Yamada ............. G01N 29/4454
2004/0236529 A1 * 11/2004 Esterling ................ B23Q 17/12
702/108
2015/0007634 A1 * 1/2015 Wallace .................. G01M 7/08
73/12.09
2018/0120262 A1 5/2018 Tai et al.

OTHER PUBLICATIONS

Matsubara et al., Non-contact measurement of spindle stiffness by using magnetic loading device, International Journal of Machine Tools and Manufacture, vol. 71, August, pp. 20-25, <https://www.sciencedirect.com/science/article/pii/S0890695513000552 > (Year: 2013).*
Wang et al., Measurement Research of Motorized Spindle Dynamic Stiffness under High Speed Rotating, Shock and Vibration, vol. 2015, Article ID 284126, <https://www.hindawi.com/journals/sv/2015/284126/> (Year: 2015).*
Yan et al., Modal Parameter Identification from Output-only Measurement Data: Application to Operating Spindle Condition Monitoring, Proceedings of the 8th International Conference on Frontiers of Design and Manufacturing, Sep. 23-26, <https://tsapps.nist.gov/publication/get_pdf.cfm?pub_id=824684> (Year: 2008).*
Partial European Search Report for Application No. 18 175 533.1 dated Dec. 12, 2018 (11 pages).
Extended European Search Report for Application No. 18 175 533.1 dated Mar. 19, 2019 (10 pages).

* cited by examiner

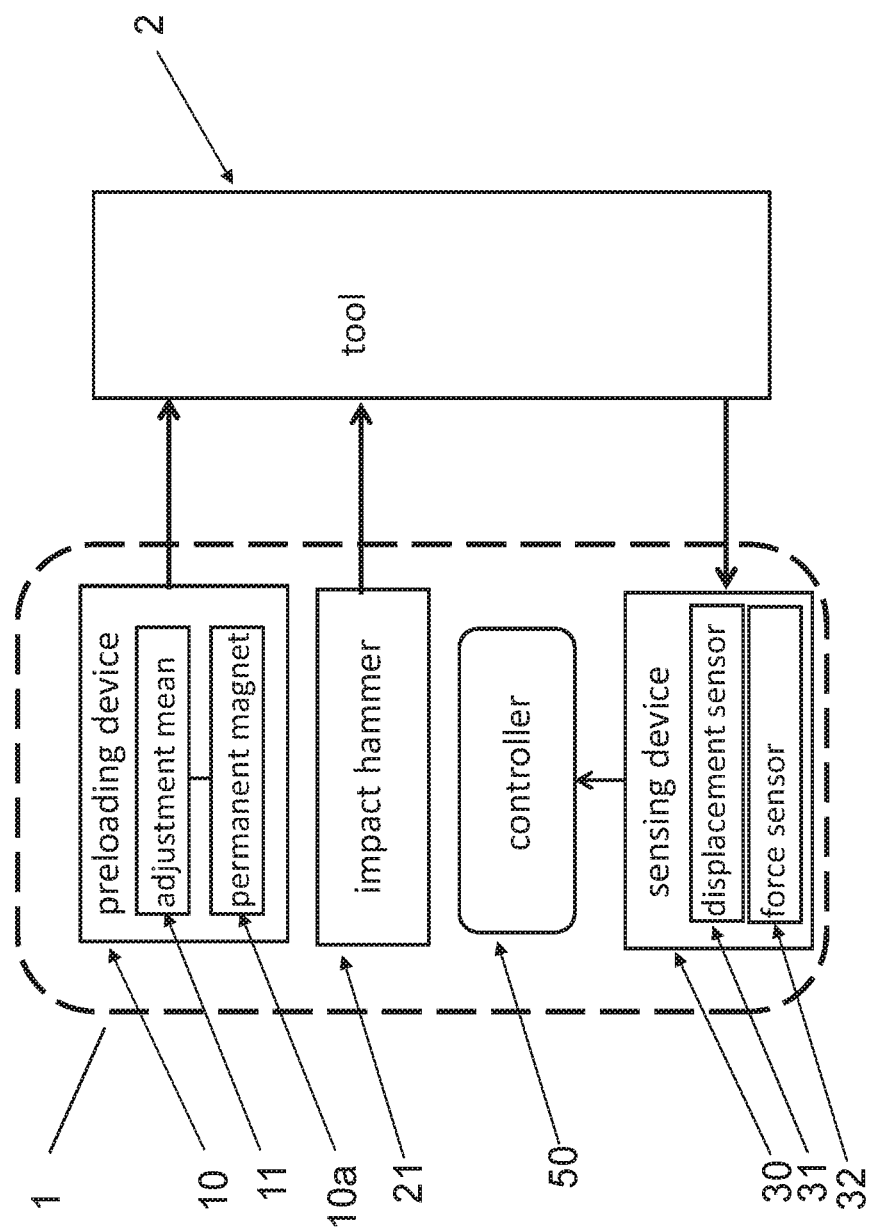

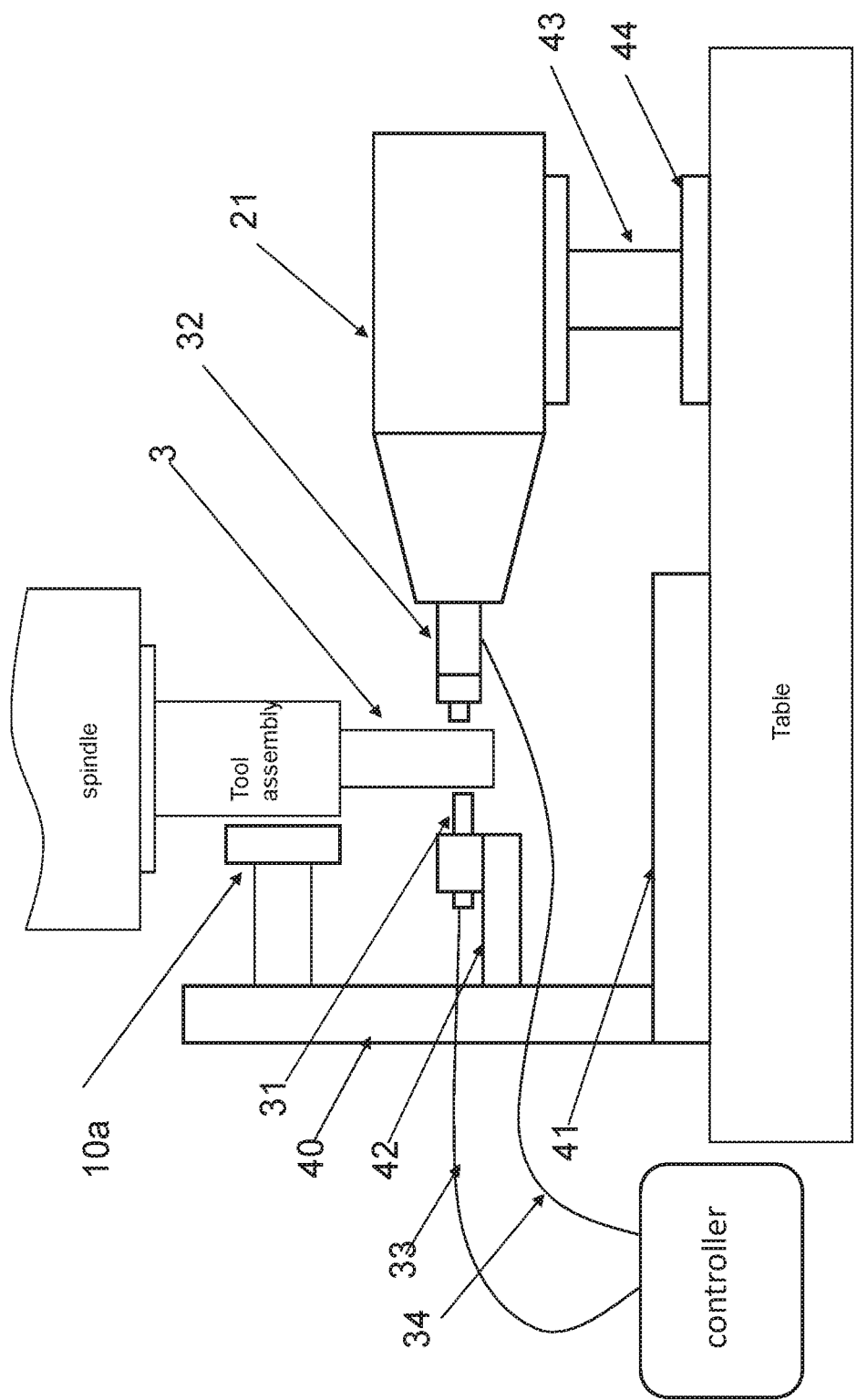

SYSTEM AND METHOD FOR DETERMINING STRUCTURAL CHARACTERISTICS OF A MACHINE TOOL

CROSS-REFERENCE TO RELATED APPLICATIONS

This application claims the benefit and priority of European Application No. 18 175 533.1, filed Jun. 1, 2018. The entire disclosure of the above application is incorporated herein by reference.

BACKGROUND

The present invention is directed to a system and a method for determining structural characteristics of a machine tool.

FIELD OF THE INVENTION

In order to predict the outcome of a machining process and thus enable its optimization, the structural characteristics of the machine tool, and more specifically its resulting behavior at the tip of the tool used in the machining process, must be precisely known. For instance, in the milling process, predicting the interaction between the structural characteristics of the machine tool under machining conditions and the cutting process allows determining the so called stability lobes diagram. The stability lobes diagram represents the stability limit of the process subject to self-excited chatter vibrations between cutting tool and workpiece induced by regenerative phenomenon with respect to the rotation speed of the tool, namely spindle and the depth of cut.

The structural characteristics required for the computation of the stability lobes diagram is the dynamic compliance between the tool and the workpiece. The dynamic compliance is defined by the frequency response function of the relative displacement between the tool tip and the workpiece over the corresponding force acting between the tool tip and the workpiece.

To identify the structural characteristics, impact testing with an instrumented impact hammer is generally used. An instrumented impact hammer is a device that introduces an excitation force pulse into the test structure by hitting the test structure, for example the tool, and enables the measurement of the generated force by integrating a force sensor. The frequency response function at the tool is determined by measuring the response to the impact force induced in the tool. In order to get the dynamic compliance between the tool and the workpiece, frequency response function must also be measured on the workpiece side and then combined with those obtained on the tool side.

The measurement conditions using standard impact hammer are normally very different from the loading conditions during the machining, especially on the tool side. This is due to the fact that, for safety reasons, the use of an impact hammer is only recommended with a non-rotating tool but the rotation of the spindle shaft during machining might strongly influence the resulting tool tip dynamics. Furthermore, the mechanical load generated by the machining process can be represented as the addition of static and dynamic force components; the static component corresponding to the average machining force, but the impact generated by the hammer does not induce any static load component. Therefore, for structure presenting a strong dependency on loading parameters or tool rotational speed, the difference between machining and measurement conditions may cause important prediction errors. This is typically the case for spindles where the shaft is supported by angular contact ball bearings. The resulting contact angle, respectively the stiffness of the bearing system is influenced by the rotational speed of the shaft. The stiffness of such bearing is also dependent on the preload of the bearings. The machining process is susceptible to generate important static loading that tends to increase or decrease the effective preload of the bearing and potentially modifies the resulting stiffness.

Moreover, due to the manually operating of hammer handled by an operator, the magnitude and the location of the impact may significantly vary which leads to important variations in the resulting frequency response and therefore large measurement uncertainty. This is especially true in frequency ranges away from resonance peaks where less energy is induced by the impact testing but still relevant for the prediction of stability lobes diagram.

EP 2824440 describes a system for modal impact testing. The system comprises a first set of components and a second set of components, which is separate from the first set of components. The first set of components and the second set of components comprise a modal impact testing system for modal impact testing. An impact system of the modal impact testing system is configured to impact a test element rotating at operational speeds.

The known system and method for determining the structural characteristics of a machine tool are disadvantageous in that the measurement condition does not consider the influence of the static load possibly generated by the machining process in combination with the rotation of the cutting tool and thus differs from the real machining condition thereby prediction errors are caused.

SUMMARY

It is an aspect of this invention to provide a system and a method for determining structural characteristics of a machine tool, which avoids the disadvantages of the prior art solution.

In particular, it is an aspect of this invention to provide a system and a method for determining structural characteristics of a machine tool, which improves the accuracy of the determined structural characteristics.

A further aspect of this invention is to provide a system and a method for determining the structural characteristics of a machine tool, which enables a more automated setup.

According to the present invention, these aspects are achieved through the features of the independent claims. In addition, further advantageous embodiments follow from the dependent claims and the description.

EP 2916187 relates to a chatter database system, which includes a central chatter database. The central database is fed with data corresponding to the machining and chatter conditions of machining tools. The data fed to the central chatter database is obtained and collected from at least two individual machining tools included in the chatter database system. The data is sent to the central chatter database to generate chatter stability maps based on real conditions. The system and the method disclosed in the present invention can be applied for the chatter database system disclosed in EP 2916187 to determine the structural characteristics of a machine tool.

According to an embodiment of the present invention, a system for determining the structural characteristics of a machine tool comprises an excitation device, a preloading device and a sensing device. The excitation device is configured to induce a dynamic excitation in a tool used in the machine tool, especially at the cylindrical part of the tool. The preloading device is configured to generate a static force on the tool. The sensing device is applied to acquire a set of data based on which the structural characteristics of the tool can be determined. For structure being strongly dependent on specific factors, it is necessary to determine the structural characteristics in measurement conditions representative of the machining conditions. By applying the system including the excitation device and the preloading device, both dynamic load and static load may be introduced in the tool. Therefore, the machining conditions can be precisely simulated in the measurement conditions.

In one preferred embodiment, the system can be applied when the tool rotates around a rotation axis. When the dynamic excitation is induced in the tool during the rotation of the tool, the more reliable frequency response functions can be obtained, which results in an accurate determination of the structural characteristics. This embodiment is in particular advantageous for determining the structural characteristics of a machine tool, such as used in the milling process. Milling is an interrupted cutting process generating periodic cutting forces between the tool tip and the workpiece while the tool is rotating. This resulting load can be represented as the combination of static and dynamic cutting force components in both radial and axial directions. The preloading device may generate a static force representing the average cutting force. Therefore, the system according to the present invention ensures the determining of the structural characteristics of the tool tip in measurement conditions which is more representative of the machining conditions and the structural characteristics of the machine tool can be predicted more precisely. Logically, a more accurate stability lobes diagram of the milling process can be obtained.

In one embodiment, the preloading device is configured to generate magnetic force on the tool. The generated magnetic force is equal to a predefined static force.

In a variation, the preloading device includes at least one permanent magnet to generate the magnetic force on the tool in the radial direction or in the axial direction of the rotation axis of the tool.

In another variant, the magnetic force is generated by an electromagnet. The preloading device comprises a coil around a core. Ferromagnetic material can be used as the core. By applying a current through the coil, a magnetic field is produced. This variant has the advantage of fast changing the magnetic field by changing the current.

For tools made of material susceptible to be magnetized in the presence of a magnetic field, such as ferromagnetic or diamagnetic, the permanent magnet arranged in the proximity of the tool generates an attractive, respectively a repulsive magnetic force, which is dependent on the distance between the permanent magnet and the tool, the magnetic field strength generated by the permanent magnet, the geometry of both objects and the magnetic permeability of the tool material. The distance to set between the permanent magnet and the tool to achieve the predetermined preload can either be computed, typically using finite element method, or measured by placing a force sensor within the force path between the preloading device and the machine tool table.

In one advantageous variation, the preloading device includes at least two permanent magnets to generate the magnetic forces on the tool in the radial direction and in the axial direction of the rotation axis of the tool. In this variation, a first magnetic force is generated in a radial direction of the rotation axis by a first permanent magnet arranged in the radial direction of the rotation axis, while a second magnetic force is generated in the axial direction of the rotation axis by a second permanent magnet arranged in the axial direction of the rotation axis. The predefined static force may comprise components in the radial direction and in the axial direction. By integrating two permanent magnets independently in the system, the two components of the static force may be individually introduced in the measurement conditions.

In a preferred embodiment, the preloading device further comprises an adjustment means for adjusting the magnetic force generated by the permanent magnet to the predefined static force. The permanent magnet located close to the rotating tool generates a static load.

In one variation, the adjustment means includes at least one fine thread screw operational connected to the permanent magnet such that the distance between the permanent magnet can the tool can be changed, thereby the magnetic force generated by the permanent magnet can be varied. By adjusting the gap between the tool and magnet through the fine thread screw, it is possible to generate a force equivalent to the predefined static force, for example, the static component of a cutting force. This enhances the flexibility of the system and at the same time the static force level acting on the tool can be regulated in a simple manner.

Another variant to vary the magnetic force generated by the permanent magnet is to adjust the position between the tool and machine table. For example, by controlling the machines axes, the tool can be repositioned to enable variation of the distance between the permanent magnet and the tool. Since the machine axes can be precisely controlled, the distance and the resulted magnetic force can be controlled precisely.

In one embodiment, the predefined static force is a static component of a cutting force when then the tool is a cutting tool. The cutting tool is not limited to a particular machining process. It can be the cutting tool used in different machining processes: turning, shaping, milling, drilling, grinding.

In the application of milling process, the average cutting force to simulate by the preloading device can typically go up to 500 N. Such order of magnitude can be achieved using for instance cylindrical Neodymium-Iron-Boron permanent magnet of 50 mm diameter and considering tool made of ferromagnetic material with a diameter of 30 mm and a distance between permanent magnet and tool of ca. 1 mm.

In some embodiments, the excitation device is configured to induce an impact force by using an impact hammer. In a preferred variation, an automatic instrumented impact hammer device is chosen to enable the generation of an adjustable accurate excitation. Automatic impact hammer device uses an actuating system to automatically move an end tip in order to generate a proper impulse force when impacting a target object. Automatic impact hammer enables the generation of adjustable and repeatable impact and is normally instrumented with a force sensor placed between the end tip and the actuating system. In particular, the impact force is induced on a cylindrical part of the tool, for example in the part above the cutting part of a cutting tool. However, it is also considerable to use a dummy tool on which the cutting part is not formed but features the same structural characteristics.

In some embodiments, the sensing device includes at least one non-contact displacement transducer to measure the position of the tool such that the deviation of the position of the tool can be derived. It is advantageous to arrange two non-contact displacement transducers in a way such that during measurement they are located orthogonally in the radial plane of the tool.

In some variations, the non-contact displacement transducer is a capacitive or eddy-current sensor, or a laser vibrometer.

In an embodiment, the sensing device includes a first force sensor for measuring the magnitude of the impact force acted on the tool. The frequency response functions can be derived by using the measured position of the tool as a response signal and the measured impact force as an input signal.

In a further embodiment, the system further comprises a controller configured to control the excitation device, for example to control the triggering and the magnitude of the impulse force generated by an automatic impact hammer. The controller is further configured to receive a set of data acquired by the sensing device, such as the measured position of the tool and the impact force induced in the tool by the impact hammer. The set of data may be transferred from the sensing device to the controller using wire communications or wireless communications. It is possible to configure the controller to determine the structural characteristics based on the received set of data.

The use of an automatic impact hammer enables the generation of an adjustable and accurate excitation. The magnitude of the impact force must thus be calibrated in order to generate a dynamic excitation representative of the corresponding machining process. As the automatic impact hammer is mounted on a fixture and not manually handled by an operator, the high repeatability of the generated impacts enables a more accurate characterizing of the critical modes. Using a controller, the whole measurement procedure can also be automated. Besides, it also allows impacting the tool while the tool is rotating without any risk of injury for the operator as the impact hammer does not require any manipulation from an operator in the working area of the machine.

In one variation, the magnetic force generated by the permanent magnet can be calibrated to the predefined static force using a second force sensor integrated in the system. For example, a force sensor can be placed between the permanent magnet and the adjustment mean.

According to one embodiment of the present invention, the system is used to determine the structural characteristics of a machine tool used in one of: milling process, turning process, shaping process, drilling process or grinding process.

In one variant, a pallet system which can be automatically placed on or removed from the machine table is chosen as a support means on which the system can be mounted. The pallet system may include a docking device for communications and power supply. By this way, the automation of the testing can be further improved. According to one embodiment of the present invention, a method for determining the characteristics of a machine tool used in the machine tool comprises the following steps: mounting a tool to a tool holder in a machine tool, placing stably a system including an excitation device, a preloading device and a sensing device closely to the tool in a position that the excitation device can induce a dynamic force in the tool and the preloading can exert a static force on the tool, operating the tool in a rotating state, inducing the dynamic force of in the tool by the excitation device, acquiring a set of data by the sensing device; and determining the structural characteristics of the machine tool based on the acquired set of data.

In a preferred embodiment, the method further comprising the following steps: adjusting a magnetic force generated by a permanent magnet on the tool by an adjustment means to a predefined static force, inducing an impact force by an impact hammer into the tool, measuring the magnitude of the impact force by a first force sensor, and measuring the position of the tool by a non-contact displacement transducer.

BRIEF DESCRIPTION OF THE DRAWINGS

In order to describe the manner in which advantages and features of the disclosure can be obtained, in the following a more particular description of the principles briefly described above will be rendered by reference to specific embodiments thereof which are illustrated in the appended drawings. These drawings depict only exemplary embodiments of the disclosure and are not therefore to be considered to be limiting of its scope. The principles of the disclosure are described and explained with additional specificity and detail through the use of the accompanying drawings in which:

FIG. 5 illustrates the block diagram of a third embodiment of the system;

FIG. 6 illustrates the arrangement of the third embodiment of the system.

DESCRIPTION

Figure 1:
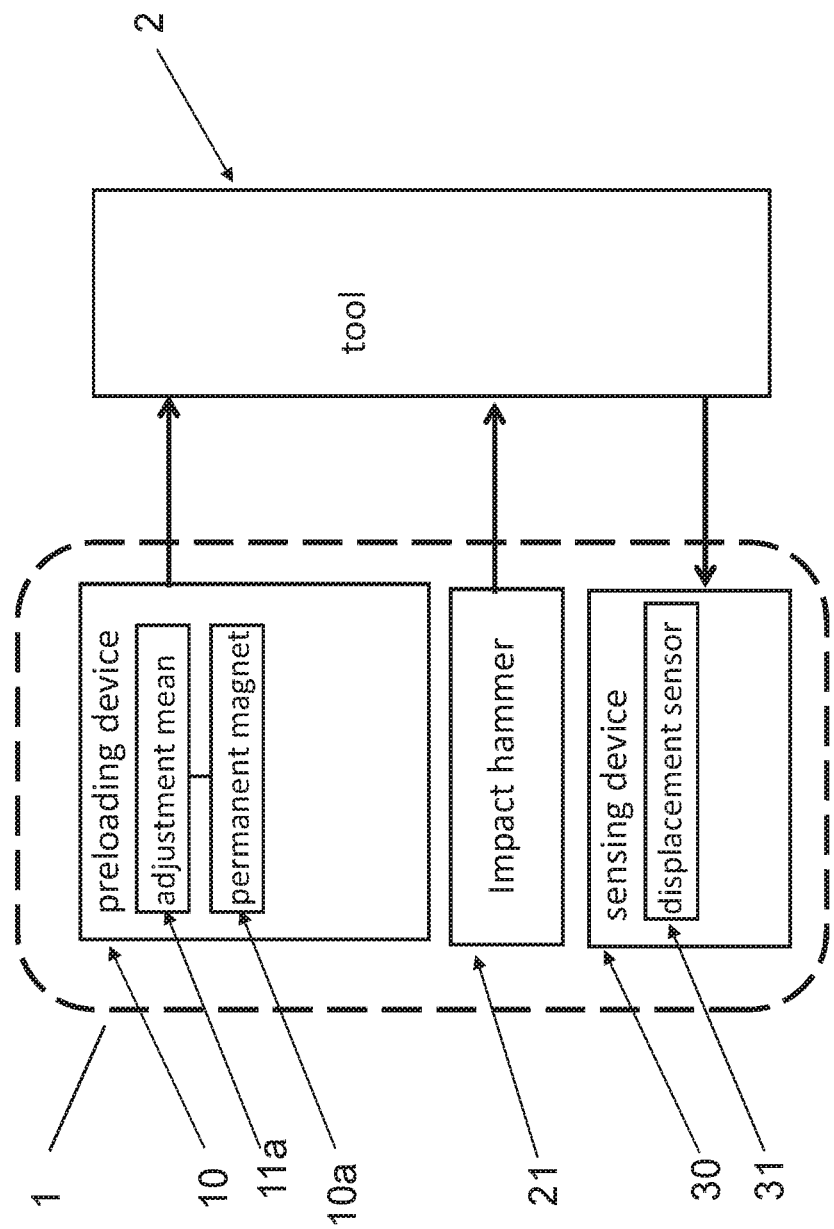
FIG. 1 illustrates a block diagram of a first embodiment of the system.

FIG. 1 illustrates a block diagram of the first embodiment of the system 1, which comprises a preloading device 10, an automatic impact hammer 21 as an excitation device and a sensing device 30. The preloading device is configured to act a static force on a tool 2 used in a machine tool and includes a first permanent magnet 10a and a first adjustment means 11a. The automatic impact hammer is applied to induce a dynamic excitation on the tool. The sensing device 30 comprises a non-contact displacement transducer 31 to measure the position of the tool from which the deviation of the tool position can be derived.

Figure 2:
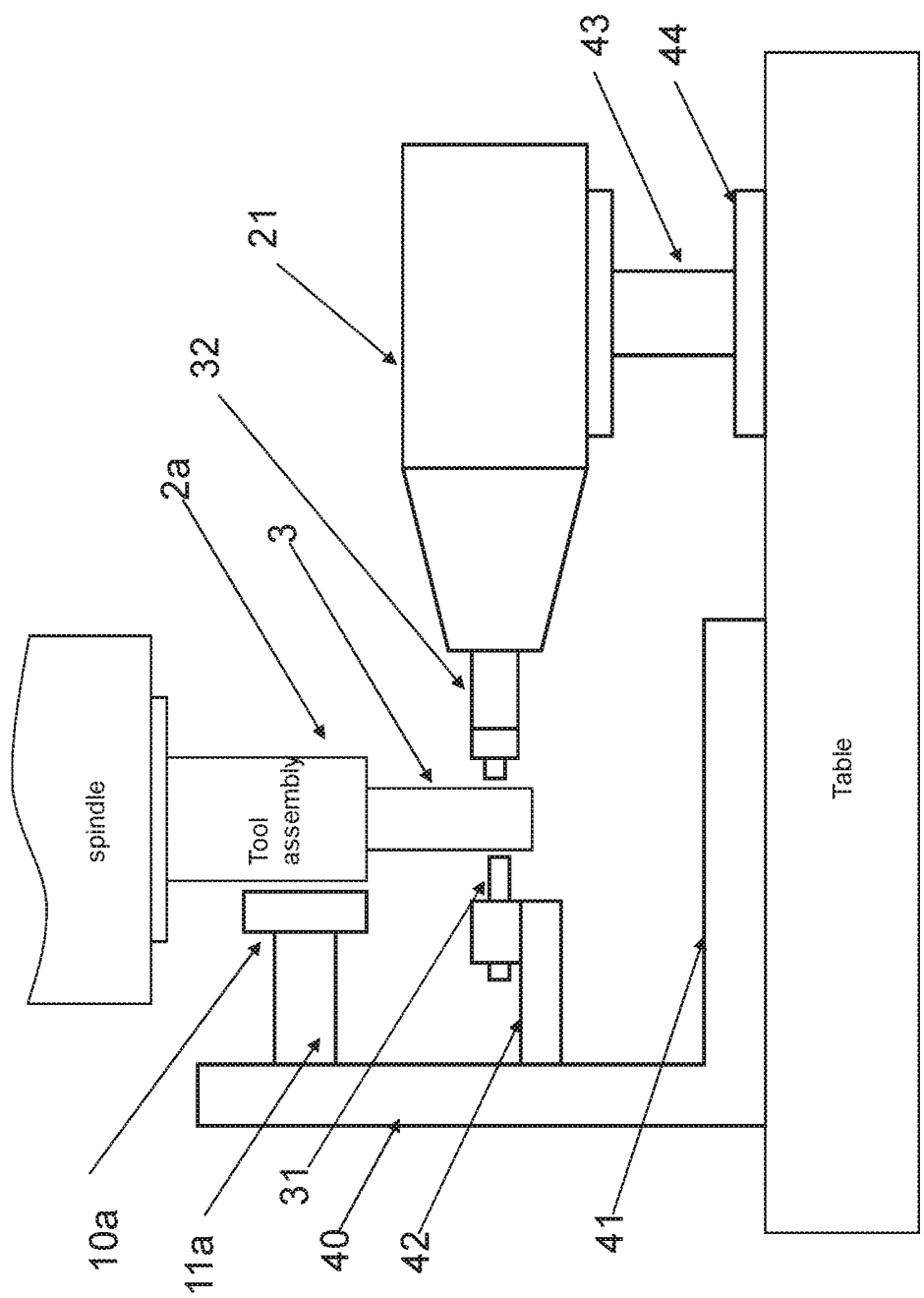
FIG. 2 illustrates the arrangement of the first embodiment of the system.

FIG. 2 shows the arrangement of the first embodiment for determining the characteristics of the machine tool. FIG. 2 illustrates an example of determination the characteristics of a cutting tool 2a used for example in a milling process. However, the system according to the present invention is not limited to the application to the milling process. The cutting tool to be characterized is mounted in a spindle of the milling machine. A first permanent magnet 10a is located in the proximity and in the radial direction of a rotation axis of the cutting tool. A first adjustment means 11a is connected at one end to the permanent magnet and at the other end to a supporting frame 40. The adjustment means is arranged such that its position can be varied along the supporting frame to ensure an optimal positioning of the permanent magnet. As shown in FIG. 2, the permanent magnet is positioned in the proximity of the tool in the radial direction of the rotation axis of the tool and having a distance to the tool in the range between typically 0.5 to 20 mm. A supporting arm 42 is mounted on the first supporting frame below the adjustment means and parallel to it. A non-contact displacement transducer is arranged on the supporting arm and positioned to measure in the radial direction of the rotation axis of the tool and has a distance to the tool in the range of typically 1 to 5 mm. The first supporting frame is vertically fixed mounted on a first supporting base 41, which is designed to be stably placed for example on the table of the machine tool during testing. An automatic impact hammer 21 is mounted on a second supporting frame 43, which is vertically fixed mounted on a second supporting base 44. The second supporting base is designed to prevent the transmission of reaction force susceptible to disturb the sensing and preloading devices. By using the automatic impact hammer instead of a standard impact hammer manually manipulated by an operator, the repeatability of the generated impact force is increased and therefore the structural characteristics determined by using this system are more accurate. To obtain a frequency response function, the magnitude of the impact force induced by the impact hammer must be measured. Therefore, a first force sensor 32 is integrated on the automatic impact hammer and positioned in the testing state close to the end tip impacting the cutting tool to be characterized.

The arrangement of the system as shown in FIG. 2 allows determining the characteristics of the tool in a rotating state as in a machining condition, such as rotated at the different operation speeds.

Figure 3:
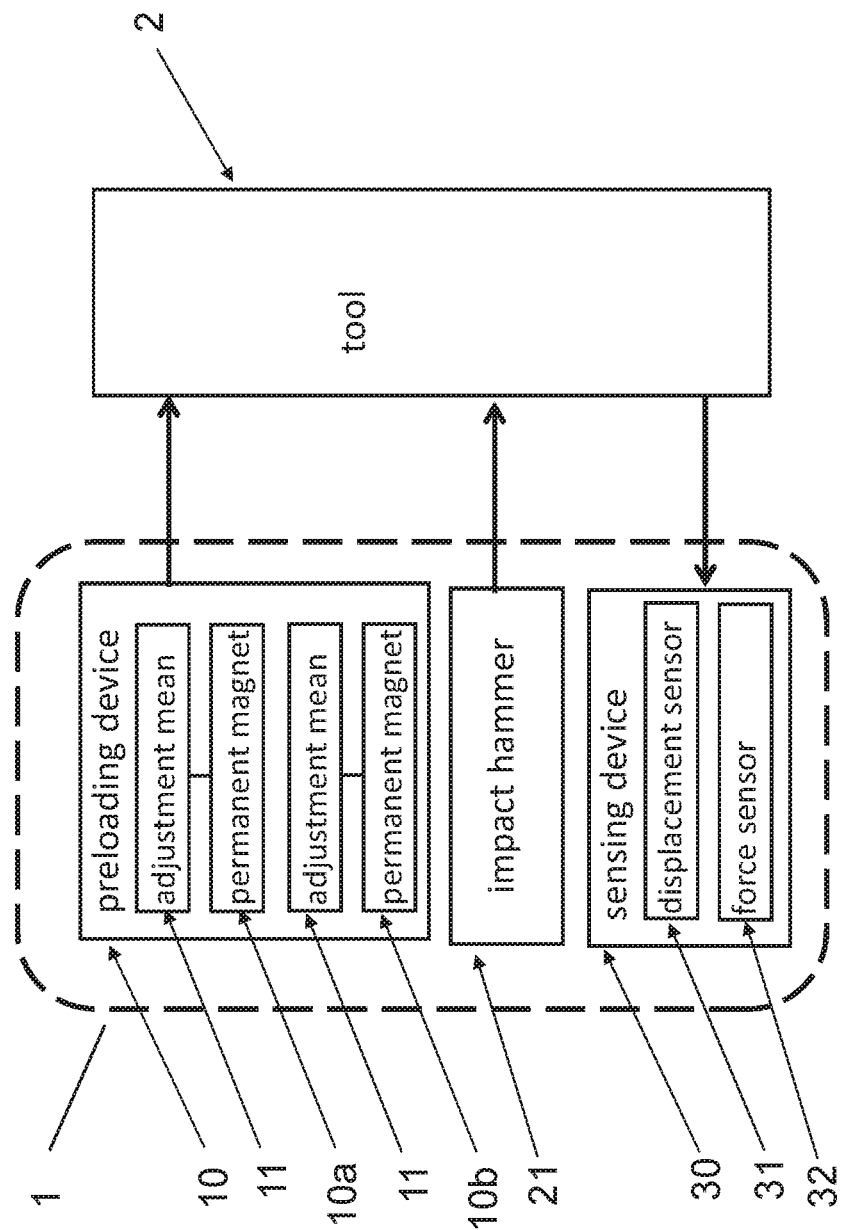
FIG. 3 illustrates the block diagram of a second embodiment of the system.

FIG. 3 illustrates a block diagram of a second embodiment of the system 1. This embodiment differs from the first embodiment in that the preloading device includes additionally a second permanent magnet 10*b* and a second adjustment means 11*b* operational connected to the second permanent magnet to improve the accuracy of the characterization.

Figure 4:
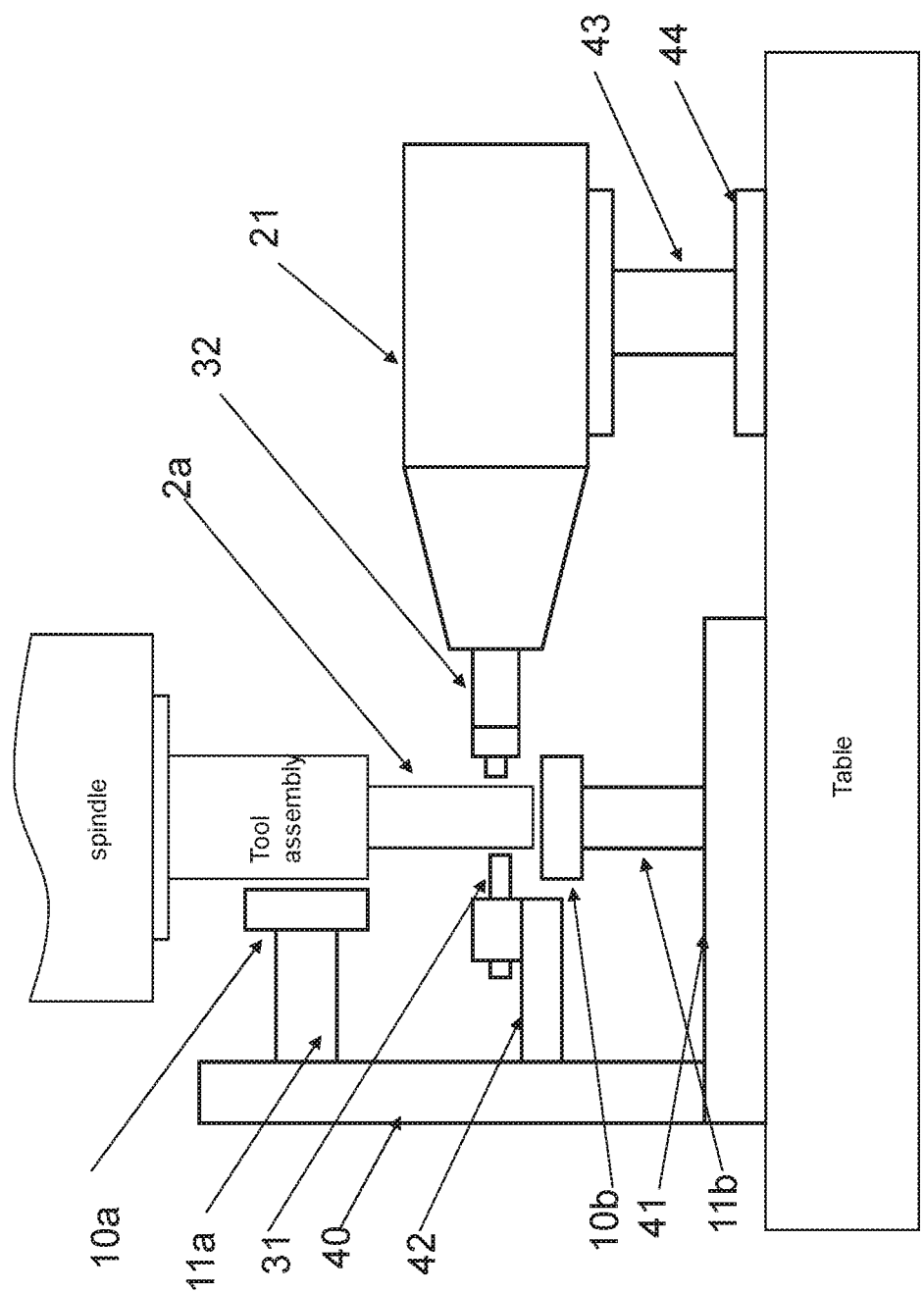
FIG. 4 illustrates the arrangement of the second embodiment of the system.

FIG. 4 shows the arrangement of the second embodiment of the system during the testing. The second adjustment means is arranged directly on the first supporting base such that the second permanent magnet is in the testing state positioned in the axial direction of the rotation axis and below the tool to be characterized. The first permanent magnet 10*a* and the second permanent magnet 10*b* generate a magnetic force in the radial direction of the rotation axis and a force in the axial direction of the rotation axis, respectively. This provides the advantage that the force acting on the cutting tool 2 in the machining state can be more precisely simulated. In the case of the milling process, the magnetic forces acting on the testing tool correspond to the average cutting forces in the machining condition.

FIGS. 5 and 6 illustrate a third embodiment of the system, in which a controller is integrated. The controller is configured to control the automatic impact hammer, receive a set of data measured by the non-contact displacement transducer and the first force sensor. FIG. 6 shows a variant of connecting the controller to non-displacement transducer and to the first force sensor by wires 33 and 34 to transfer the data from the sensors to the controller. The controller is also connected to the automatic impact hammer by wire 35 to enable the adjustment and the triggering of the impact force. However, a wireless communication between the controller and the displacement transducer, the first force sensor and the automatic impact hammer is also applicable to provide a flexible design of the system.

The invention claimed is:

1. A system for determining the structural characteristics of a machine tool comprising:
    an excitation device configured to induce a dynamic excitation in a tool used in the machine tool;
    a preloading device configured to generate a static force on the tool;
    a sensing device for acquiring a set of data based on which the structural characteristics of the machine tool can be determined; and
    wherein the preloading device includes at least one permanent magnet to generate the magnetic force on the tool in the radial direction or in the axial direction of the rotation axis of the tool.

2. The system according to claim 1, wherein the system can be applied when the tool rotates around a rotation axis.

3. The system according to claim 1, wherein the preloading device is configured to generate a magnetic force which is equal to a predefined static force.

4. The system according to claim 3, wherein the preloading device includes at least two permanent magnets to generate the magnetic forces in the radial direction and in the axial direction of the rotation axis of the tool.

5. The system according to claim 1, wherein the preloading device further comprises an adjustment means for adjusting the magnetic force generated by the permanent magnet to the predefined static force.

6. The system according to claim 5, wherein the adjustment means includes at least one fine thread screw operational connected to the permanent magnet such that the distance between the permanent magnet and the tool can be changed, thereby the magnetic force generated by the permanent magnet can be varied.

7. The system according to claim 1, wherein the predefined static force is equal to the average cutting force when the tool is cutting.

8. The system according to claim 1, wherein the excitation device is an impact hammer.

9. The system according to claim 1, wherein the sensing device includes at least one non-contact displacement transducers to measure the position of the tool.

10. The system according to claim 9, wherein the non-contact displacement transducer is a capacitive sensor, or an eddy-current sensor, or a laser vibrometer.

11. The system according to claim 1, wherein the sensing device includes a first force sensor for measuring the magnitude of the impact force.

12. The system according to claim 1, wherein the system further comprises a controller configured to control the excitation device, to receive the set of data acquired by the sensing device and to determine the structural characteristics of the tool based on the received set of data.

13. The system according to claim 1, wherein a second force sensor is integrated in the system for measuring the force generated by the preloading device on the tool.

14. A method for determining the characteristics of a machine tool comprising:
    mounting a tool to a spindle in the machine tool;
    placing stably the system according to claim 1 closely to the tool in a position that an excitation device can induce a dynamic force in the tool and the preloading device can exert a static force on the tool;
    operating the tool in a rotating state;
    inducing the dynamic force into the tool by the excitation device;
    acquiring a set of data by the sensing device;
    determining the structural characteristics of the machine tool based on the acquired set of data;
    adjusting a magnetic force generated by a permanent magnet on the tool by an adjustment means to a predefined static force;
    inducing an impact force by an impact hammer into the tool;

measuring the magnitude of the impact force by a first force sensor; and measuring the position of the tool by a non-contact displacement transducer.

* * * * *